United States Patent [19]
Eaton-Williams

[11] 3,944,785
[45] Mar. 16, 1976

[54] ELECTRODE BOILER WITH AUTOMATIC CONTROL

[76] Inventor: Raymond H. Eaton-Williams, "Beech House", Pendennis Road, Sevenoaks, Kent, England

[22] Filed: Feb. 15, 1974

[21] Appl. No.: 442,886

[30] Foreign Application Priority Data
Aug. 3, 1973 United Kingdom............... 36934/73
Aug. 3, 1973 United Kingdom............... 36934/73
Feb. 4, 1974 United Kingdom................. 7835/74

[52] U.S. Cl. ............... 219/286; 219/273; 219/295; 219/501; 338/86
[51] Int. Cl.² ......................... H05B 1/02; H05B 3/60
[58] Field of Search ........................... 219/284–295, 219/271–276, 501, 362; 338/80–86

[56] References Cited
UNITED STATES PATENTS

| | | | |
|---|---|---|---|
| 1,462,350 | 7/1923 | Merrill et al. | 219/286 |
| 1,650,632 | 11/1927 | Kowallik | 219/284 X |
| 1,665,793 | 4/1928 | Sandborgh | 219/286 |
| 2,453,211 | 11/1948 | Eaton | 219/294 X |
| 3,083,288 | 3/1963 | Vischer | 219/285 X |
| 3,114,028 | 12/1963 | Vischer | 219/284 X |
| 3,219,796 | 11/1965 | Graf et al. | 219/285 |
| 3,761,679 | 9/1973 | Dall | 219/295 X |
| 3,780,261 | 12/1973 | Eaton-Williams | 219/295 UX |

FOREIGN PATENTS OR APPLICATIONS

| | | | |
|---|---|---|---|
| 1,930,950 | 2/1970 | Germany | 219/287 |
| 1,139,911 | 1/1969 | United Kingdom | 219/295 |
| 315,034 | 2/1934 | Italy | 219/284 |

Primary Examiner—A. Bartis
Attorney, Agent, or Firm—Berman, Aisenberg & Platt

[57] ABSTRACT

An electrode boiler includes a plurality of veritcal electrodes arranged in a container having an open steam outlet at its top whereby the boiler operates at substantially atmospheric pressure. The boiler is provided with electrically controlled feed and drain valves and a water level sensing electrode is provided in the container. Electronic solid state control circuitry includes means response to the water level sensed by water level sensing electrode for controlling operation of the feed valve to replace water boiled away thereby maintaining a constant water level in the boiler. The electronic control circuitry also includes current responsive means operative to open the drain valve when the electrode current reaches a predetermined maximum magnitude irrespective of the water level and to close the drain valve when the electrode current falls to a predetermined lower value. The control circuitry includes means to prevent the feed and drain valves from being open simultaneously and electronic hysteresis means to prevent the feed valve from being opened and closed in rapid succession.

5 Claims, 4 Drawing Figures

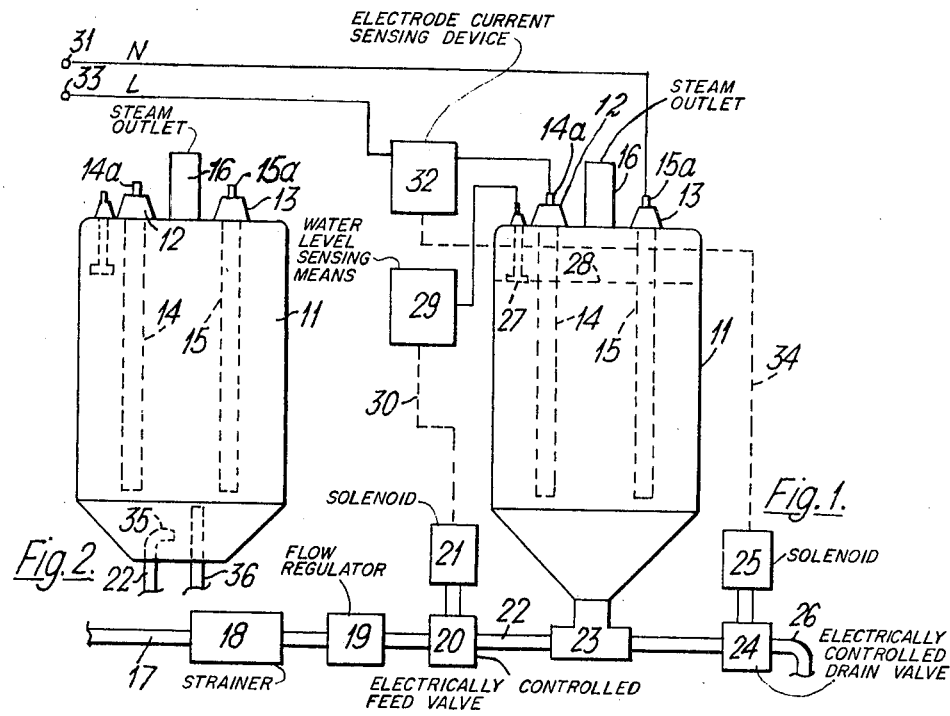

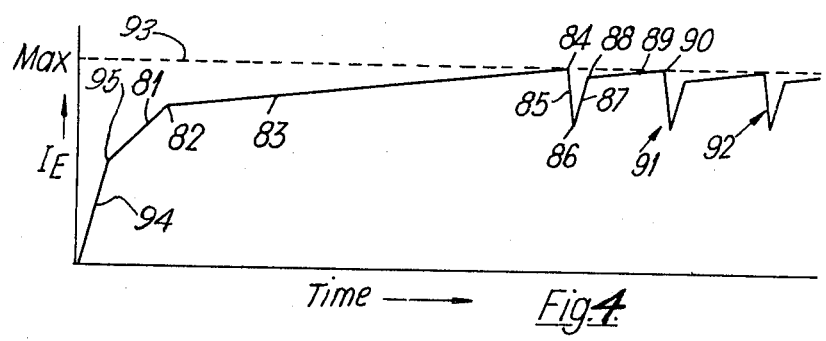

ELECTRODE BOILER WITH AUTOMATIC CONTROL

This invention relates generally to steam boilers, and more particularly to an electrode boiler of the kind which is often used as a humidifier to provide steam for use in an air conditioning plant.

In the electrode boiler the electrodes, which may consist of solid rods or rolls of wire mesh material, are placed directly, in spaced relationship, in the water to be heated and the heating current flows through the water between the electrodes, of which there may be two for connection to a single-phase electric supply or a greater number for connection to a polyphase supply. The heating current depends upon the depth of immersion of the electrodes in the water and upon the electrical conductivity of the water. The electrical conductivity of the water varies in dependence upon the amount of mineral salts dissolved in it and the amount of tiny particles of mineral matter, for example calcium oxide or lime, carried in the water. The water may also contain many elements other than lime.

The electrode boiler is normally fed from a town water supply, which may vary considerably in the amount of dissolved mineral salts and tiny particles of solid matter contained in it, some areas having relatively pure water and others having water which is heavily contaminated, i.e. contains a comparatively large amount of dissolved mineral salts etc. The pressure of town water supplies also varies over a large range.

It will be evident that if the boiler is filled with water having a particular initial level of contamination and the water is boiled continuously, the amount lost by evaporation being made up by feeding new town water into the boiler, the amount of contamination of the water in the boiler will gradually increase until it reaches an unacceptable level at which solid matter in the form of lime or other substances is deposited very rapidly on the electrodes. When the degree of contamination rises above the acceptable limit it is necessary to remove some of the offending matter by draining a proportion of the water out of the boiler and replacing it with fresh town water.

Electrode boilers at present available suffer from numerous shortcomings in respect to their controls and the principal object of the invention is to provide an electrode boiler having an automatic control which is very simple in conception but which will nevertheless provide a control of a very high order, combined with reliability, and which may be manufactured economically.

The invention consists of an electrode boiler in which the electrode current varies with the depth of immersion of the electrodes in the water to be boiled and the degree of contamination of the water by dissolved mineral salts and particles of solid mineral matter comprising means to feed water to the boiler to replace water boiled away and to maintain a substantially constant water level in the boiler, electronic circuitry to sense the magnitude of the electrode current, an electrically controlled drain valve, circuitry responsive to the sensing circuitry to open the drain valve when the magnitude of the electrode current rises to a predetermined maximum value, and means to close the drain valve when a desired quantity of water has been drained from the boiler.

The means to feed water to the boiler and to maintain a substantially constant water level in the boiler may comprise a level sensing electrode placed in the boiler at a height at which the water level is to be controlled, sensing circuitry to sense when the water level reaches the sensing electrode, and an electrically controlled feed valve responsive to the sensing circuitry.

The circuitry to sense the magnitude of the electrode current may comprise a current transformer having its primary winding connected in series with one boiler electrode, whereby a voltage proportional to the electrode current is induced in the secondary winding.

Preferred embodiments of the invention will now be described with reference to the accompanying drawings in which FIG. 1 shows schematically one embodiment of the invention;

FIG. 2 shows an alternative arrangement of the feed and drain connections to the boiler of FIG. 1;

FIG. 4 is a graphical representation of the operation of the boiler.

Figure 3:
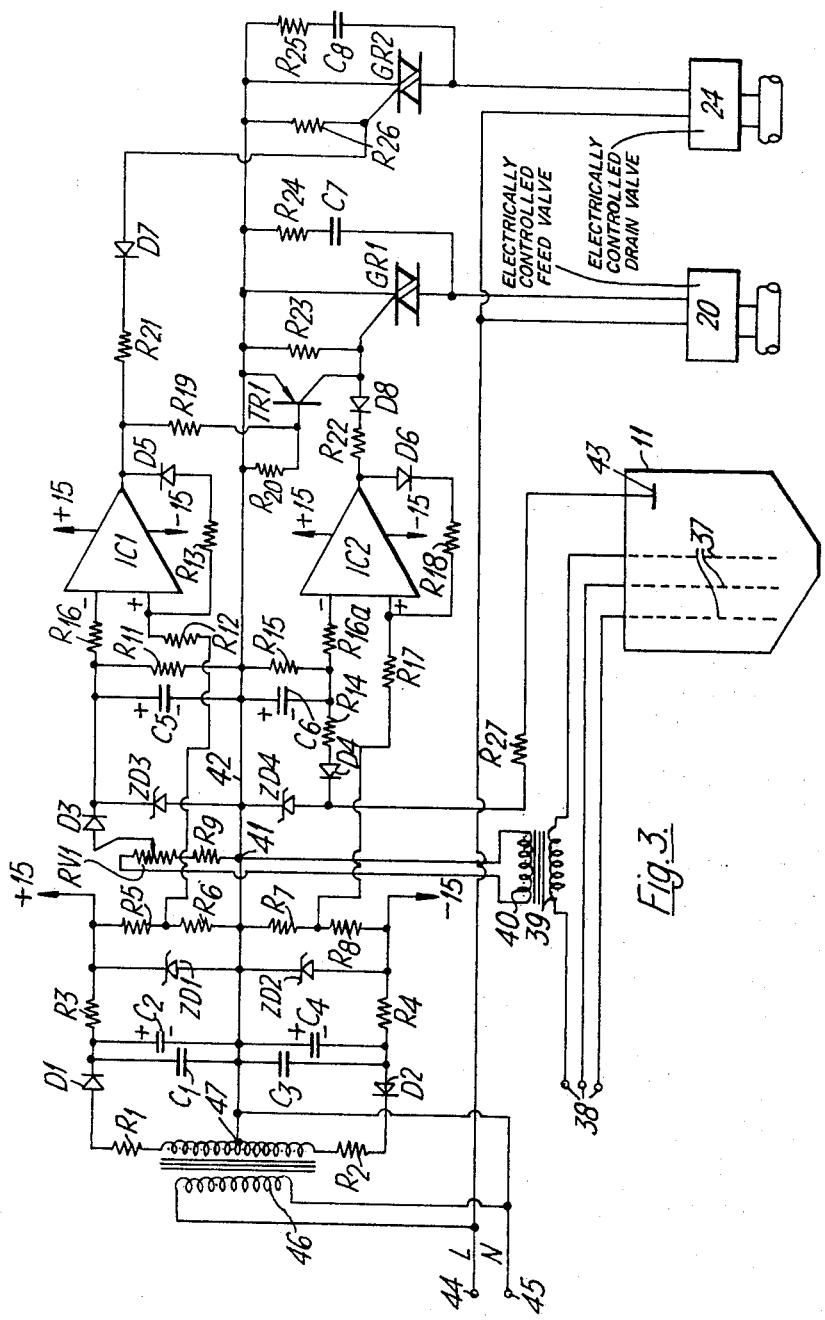
FIG. 3 is a circuit diagram of an electronic control for the boiler of FIG. 1 or 2.

Referring to FIG 1, the electrode boiler comprises a container 11, which may conveniently be made of synthetic plastics material, the general structure of the boiler being inexpensive so that when it is thoroughly contaminated with solid matter it may be thrown away rather than dismantled and descaled. The moulded container includes bushes 12 and 13 which support electrodes 14 and 15 (shown dotted) inside the boiler and have respective electrical connections 14a, 15a at their upper ends. These electrodes are shown as cylinders for convenience but they may be comprised of rolls or other structures of wire mesh and may be of any desired shape, to provide particular boiler characteristics. Only two electrodes are shown, for use with a single phase alternating current supply, but more electrodes may be provided for connection to a polyphase supply. The boiler may be of any desired size, but a convenient size which has a large field of application holds about 6 liters of water (about 1¼ gallons) with a "boiling space" at the top. At the top of the container is a moulded-on tube 16 through which steam is discharged at substantially atmospheric pressure for use in an air conditioning system. However, if the boiler discharges into a steam hose or into a duct through which air is being blown by a fan the steam discharge might not be quite at atmospheric pressure.

Water is supplied to the boiler through an inlet pipe 17 leading to a strainer 18 from which the water flows through a flow regulator 19. This may conveniently be an automatic flow or pressure regulating device of a kind which is available on the market. From the flow regulator 19 the water passes to an electrically controlled feed valve 20 actuated by a solenoid 21. The water then passes through a pipe 22 to one arm of a "T" piece 23 fixed to the bottom of the container 11. The other arm of the "T" piece 23 forms an outlet and this is connected to a second electrically controlled valve 24 actuated by a solenoid 25. Water passing through the valve 24 passes into a drain pipe 26.

A level sensing electrode 27 is included in the container 11 in order to maintain the water level in the boiler substantially at the level indicated by the dotted line 28. The sensing electrode 27 is connected to level sensing means 29 which in turn actuates the solenoid 21 as indicated by the dotted line 30.

It will be understood that some form of hysteresis must be provided in the level sensing device 29 to ensure that it does not rapidly open and close the feed valve. It may be arranged that the feed valve is not closed until the water level has risen to a desired degree above the bottom of the level sensing electrode or that when the water falls below the bottom of the level sensing electrode the level sensing device does not operate until the water has fallen by a particular amount below this level.

The electrode 15 is connected directly to the neutral line 31 of a mains supply network while the electrode 14 is connected through a current sensing device 32 to the live conductor 33 of the supply. The current sensing device could be a resistor, means being provided to sense the voltage drop across the resistor, but it is preferred to use a current transformer as described in more detail later. As water is continuously boiled away from the boiler the amount of contamination in the water increases due to the continual supply of new town water. As the degree of contamination increases the electrical resistance of the water falls and the electrode current rises. When the current has risen to the maximum level which is acceptable the current sensing device actuates the solenoid 25 via a line indicated in dotted lines at 34 to open the drain valve 24, whereupon some of the water from the boiler is allowed to drain away. As the water drains away the electrode current falls and when it has fallen to a predetermined lower level the solenoid 25 is de-energized and the drain valve closes.

FIG. 2 shows an alternative arrangement of the feed and drain pipes. The boiler is fed as in FIG. 1 through a feed pipe, strainer, flow regulator and feed valve with its solenoid but the "T" piece is omitted from the bottom of the boiler and the pipe 22 passes into the bottom of the boiler and has its end turned over at 35 so that it is horizontal. A drain pipe 36 is fitted into the boiler so that its upper end is well above the level of the feed pipe. The drain pipe 36 passes to the electrically controlled drain valve 24 connected to the drain 26 as before.

FIG. 3 shows a circuit diagram of the control apparatus for the boiler system of FIG. 1 or 2. It shows a boiler container 11 containing three heating electrodes 37 which have a connection to a three-phase supply from terminals 38. For connection to a single phase supply only two electrodes will be required. The electrodes are symbolically represented by the dotted lines 37 and it is to be understood that they may consist of solid rods or rolls or other shapes made from wire mesh material, as previously mentioned. In series with one of the phase lines is the primary winding 39 of a current transformer having a secondary winding 40. A voltage is induced in the primary winding 39 which is proportional to the current flowing in the electrode to which the transformer is connected and this is stepped up in the secondary winding 40 to provide a control voltage. One end of secondary winding 40 is connected to a point 41 in a common line 42, and also to one end of a resistor R9 the other end of which is connected to a variable resistor RV1, the other end of RV1 being connected to the other end of the transformer secondary winding.

The container 11 also contains a water level sensing electrode 43 which determines the approximate level to which the boiler is filled. Assuming that the boiler is initially empty, no electrode current passes and the level sensing electrode is not immersed. Under this condition, since there is no electrode current, no voltage is developed across the capacitor C5.

The slider of variable resistor RV1 is connected to the anode of a diode D3 whose cathode is connected to the cathode of a Zener diode ZD3 whose anode is connected to the common line 42. Common line 42 is connected to the cathode of a further Zener diode ZD4 whose anode is connected through a resistor R27 to the level sensing electrode 43. The cathode of diode D3 is connected to one terminal of the capacitor C5 whose other terminal is connected to the common line 42 and which is connected to one terminal of a capacitor C6 having its other terminal connected through a resistor R14 to the anode of a diode D4 whose cathode is connected to the anode of Zener diode ZD4. A resistor R11 is connected in parallel with C5 and a resistor R15 is connected in parallel with C6. The cathode of diode D3 is also connected to one end of a resistor R16 whose other end is connected to the inverting input of an integrated circuit IC1. The said other terminal of capacitor C6 is connected through a resistor R16a, which is identical with R16, to the inverting input of a further integrated circuit IC2. The non-inverting input of IC1 is connected through a resistor R13 to the anode of a diode D5 whose cathode is connected to the output terminal of IC1. The non-inverting input of IC2 is connected through a resistor R18 to the cathode of a diode D6 whose anode is connected to the output of IC2. IC1 and IC2 are both used as voltage level detectors with hysteresis, IC1 detecting the positive voltage developed across capacitor C5 and IC2 detecting the negative voltage developed across capacitor C6.

The output of IC1 is connected through a resistor R19 to the base of a p-n-p transistor TR1 whose emitter is connected to the common line 42. A resistor R20 is connected between the base of TR1 and the common line 42. The collector of TR1 is connected to the anode of a diode D8 whose cathode is connected through a resistor R22 to the output of IC2. A resistor R23 is connected between the emitter and collector of TR1. The collector of TR1 is also connected to the gate electrode of a gated rectifier GR1 having one main terminal connected to the common line 42 and the other main terminal connected to the solenoid 21 of the feed valve. A resistor R24 and a capacitor C7 are connected in series between the two main terminals of GR1. The output of IC1 is connected through a resistor R21 to the cathode of a diode D7 whose anode is connected to the gate of a further gated rectifier GR2 having one main terminal connected to the common line 42 and its other main terminal connected to the solenoid 25 of the drain valve 24. A resistor R25 and capacitor C8 are connected between the main terminals of GR2.

The other ends of the feed valve and drain valve solenoids are connected to a phase terminal 44 of a single phase supply, the neutral terminal being given reference 45. The primary winding 46 of a single phase transformer is connected to supply terminals 44 and 45. The secondary winding is centre tapped at 47, the centre tap being connected to the common line 42. Resistors R1 and R2, diodes D1 and D2, capacitors C1, C2, C3 and C4 and resistors R3 and R4 provide a rectified and smoothed low voltage supply, the capacitors C1 and C3 having a comparatively low capacitance such as $0.1\mu F$, C2 and C4 being smoothing capacitors of high capacitance, such as $500\mu F$. Zener diodes ZD1 and ZD2 provide voltage stabilization for the two halves of the supply. The outer poles of the supply are connected to the appropriate supply connections of IC1 and IC2 and each half of the supply has a voltage divider connected across it, consisting respectively of resistors R5 and R6 in series and resistors R7 and R8 is series. The junction of R5 and R6 is connected to the non-inverting input of IC1 and the junction of R7 and R8 is connected to the non-inverting input of IC2.

Assuming that the boiler is initially empty, no electrode current can pass and the level sensing electrode 43 is not immersed in water. Under this condition, since the electrode current is zero no voltage is developed across capacitor C5 and the inverting input of IC1 is at neutral potential. The non-inverting input of IC1 is held at the threshold potential determined by the divider network R5 and R6 and by the hysteresis network R11, C5. Under this condition the output of IC1 is saturated positive and D7 is reverse biased so that no gate current will flow in GR2. GR2 is therefore switched off and the drain valve 24 is closed.

As the sensing electrode is not immersed, no voltage is developed across capacitor C6 and therefore the inverting input of IC2 is at neutral potential while the non-inverting input is held at threshold potential determined by the divider network R7 and R8. Under this condition the output of IC2 is saturated negative, diode D8 is forward biased and gate current flows into GR1. GR1 is therefore switched on and the feed valve 20 is open.

Water gradually fills the cylinder at the rate permitted by the flow regulator 19 and as the electrodes become increasingly immersed a gradually increasing electrode current flows so that the water is heated. After a period the water level rises to the point at which it touches the level sensing electrode 27 and current flows through the water from the heating electrodes via R27 to ZD4, so that half cycle negative pulses appear across ZD4 having an amplitude equal to the Zener voltage of ZD4. These negative pulses charge capacitor C6 via D4 and R14. After a short period, depending upon the time constant of this circuit, which may typically be between 5 and 15 seconds, the voltage across C6, which is applied to the inverting input of IC2, exceeds the threshold voltage applied to the non-inverting input of IC2. At this point the output of IC2 swings saturated positive, gate current to GR1 is cut off and the feed valve 20 is allowed to close. Due to the delay between the instant at which the water first touches the sensing electrode and the instant at which the feed valve closes, which is caused by the time constant of R14, C6 and R15, the water level in the cylinder will have risen slightly above that at which the sensing electrode first became immersed. The water in the cylinder now boils away for a period until the water level falls below the lower surface of the sensing electrode, whereupon C6 becomes discharged through R15 and the output of IC2 again swings saturated negative so that it switches on the feed valve. This sequence of events is continued, so that the water level in the cylinder is maintained substantially constant at or near the height determined by the level sensing electrode. The parameters of the boiler electrodes etc. are so chosen that, during these early cycles of feeding after first switching on, the electrode current does not reach the predetermined maximum level. However, after a number of sequences of refilling and boiling the concentration of dissolved salts and mineral particles in the water gradually rises and, as a result, the electrode current rises and eventually reaches the maximum operating level, equivalent to the threshold level which has previously been set by the adjustment of VR1. When this occurs the voltage across capacitor C5 reaches and passes the threshold level for the switching of IC1 and the output of IC1 changes to saturated negative. This causes D7 to become forward biased, thereby allowing gate current to flow to GR2 so that the drain valve is opened. Simultaneously the base of transistor TR1 becomes negative biased due to current flowing through R19 and TR1 becomes saturated on, thereby effectively short-circuiting the gate of GR1 and preventing operation of the feed valve while the drain valve is open. These arrangements permit water to drain from the boiling cylinder until the water in the boiler falls to a certain predetermined level, which may for example correspond to 75% of the normal height, so that the electrode current falls to approximately 75% of its maximum value without allowing the feed valve to be opened. The exact depth to which draining occurs is determined by the hysteresis network R12 and R13 which resets the threshold level of IC1. When, under this condition, the drain valve eventually closes at approximately 75% of normal electrode current the inhibitor transistor TR1 becomes switched off and thereby again permits normal operation of the feed valve.

The water drained away will have been rich in dissolved and particulate minerals and is replaced by feed water having a lower mineral content, thereby lowering the mineral content of the water in the boiler.

If at the end of the next boiling cycle the electrode current does not reach the maximum level a further draining operation will not occur. However, due to the continuing increase of mineral concentration in the boiler with successive boiling cycles the maximum electrode current will again be reached during a subsequent boiling cycle and will then produce a further drain cycle.

Water drained from the boiler has previously been heated to boiling temperature and draining therefore involves some waste of power. It is desirable to reduce this to a minimum. When using the control according to the invention it is possible to decide in advance the maximum degree of contamination which is tolerable and to determine the electrode structure which will give the required steam output with this degree of contamination. The values of components may be selected and the control apparatus may be adjusted at the time of manufacture so that it will automatically allow the contamination of the water in the boiler to increase up to the predetermined maximum and will then automatically maintain it substantially at this level by draining a quantity of water from the boiler when necessary. The water continues to boil during the draining periods and the rate of refilling is sufficiently slow to enable boiling to continue.

FIG. 4 is a graph showing the operation of a boiler with a control according to the invention. The graph is plotted to a base of time and the vertical ordinate $I_E$ represents the electrode current, the predetermined maximum current being indicated by a dotted line 93.

Referring to the graph, it will be assumed that at the beginning the boiler is empty. The electric supply is turned on and the water flow is controlled at a desired level by the flow regulator 19. The water will begin to rise in the boiler. As soon as the water rises to the level of the bottom ends of the electrodes 14 and 15 the water will begin to pass current and the current will rise as indicated in the first part 94 of the graph. Eventually the water will rise to the desired level 28 (FIG. 1) when the current reaches the point 5 on the graph. This is well below the predetermined maximum current, and the electrode current will continue to rise along the portion 81 of the graph because the electrical conductivity of water increases quite considerably with increasing temperature. The water in the boiler also expands. Eventually the water boils, at the point 82 on the graph, and the boiler then goes into operation. As the water in the boiler is boiled away the new town water which is supplied continually brings with it additional contamination, so that the total contamination of the water in the boiler continually increases and the current slowly rises along the portion 83 of the graph. It will be understood that if the town water supply is very pure and contains comparatively little contamination then the rise along the portion 83 will be slow whereas if the feed water is very heavily contaminated the degree of contamination increases rapidly and the rise in conductivity will be much more rapid. Eventually the portion 83 reaches the maximum level indicated by the dotted line 93 at the point 84. At this point the gated rectifier GR2 receives its threshold gate voltage and becomes conductive, thereby energizing the solenoid 24 which opens the drain valve 25 Water now drains from the boiler and the current simultaneously falls along the portion 85 of the graph until the current has fallen to the predetermined point at which the electrode current falls below the minimum at which the voltage on the gate of GR2 falls below the "holding" level. The element GR2 switches off, and the drain valve 24,25 is closed at the point 86. New feed water now begins to refill the boiler to the level 27 and the current rises, as indicated by the section 87 of the graph, until the level 27 is again reached at the point 88. The current is, of course, below the predetermined maximum at this point because the degree of contamination of the water has been reduced, but as boiling continues the contamination will increase and the current will rise along the portion 89 of the graph until, at the point 90, the predetermined maximum is again reached, when the gated rectifier again becomes conductive to commence another drain cycle as indicated generally at 91. The process continues to repeat as shown by the further portion of the graph at 92.

From the foregoing description it will be evident that the invention provides a boiler with an extremely simple automatic control which, in spite of its simplicity, is fully comprehensive in its mode of control and in its ability to take account of all relevant factors which affect the operation of such boilers.

A situation will eventually be reached when the electrodes become so heavily encrusted with solid matter that the resistance to the current rises to a point at which the maximum current is never reached. The boiler will then continue to function without any drain periods until a final stage is reached at which the boiler will not pass sufficient current to enable a reasonable steam output to be maintained. This is the point at which the boiler must be descaled or preferably, if it is of a cheap construction using a sealed plastic container, discarded and replaced by a new one. For this purpose naturally quick and easily replaceable connections are provided. That is to say, the cable may be arranged to clip on to the electrical outlets from the electrodes, a heat-resisting flexible pipe may be pushed on to the output tube 16 and a quick and easily removable connection may be arranged between the Tee 62 and the lower end of the boiler.

I claim:

1. An electrode boiler for operation at substantially atmospheric pressure comrising a container having an open steam outlet at its top, a plurality of vertical electrodes fixed inside the container, supply circuitry to supply electric current to the electrodes, feed and drain connections to the container respectively including electrically actuated feed and drain valves, a level sensing electrode fixed inside the container, and electronic solid state control circuitry connected to the supply circuitry and to the feed and drain valves and to the level sensing electrode, the control circuitry containing voltage-responsive means operative to open the feed valve when the water in the container is out of contact with the level sensing electrode and to close the feed valve when the water in the container is in contact with the level sensing electrode, the control circuitry also containing current-responsive means operative to open the drain valve when the electrode current reaches a predetermined maximum magnitude irrespective of the water level and to close the drain valve when the electrode current falls to a predetermined lower magnitude.

2. A boiler as claimed in claim 1 in which the current-responsive means comprises a current transformer having its primary winding connected in series with one boiler electrode, whereby an alternating voltage proportional to the electrode current is induced in its secondary winding, a two-state electronic device whose output reverses its polarity when a voltage applied to an input reaches a predetermined magnitude, the transformer secondary voltage being applied as an input to the two-state electronic device through a rectifier, and a gated rectifier which controls the current supply to the drain valve, the output of the two-state device being applied to the gate of the gated rectifier.

3. A boiler as claimed in claim 1 in which the control circuitry includes means to prevent the feed and drain valves from being open simultaneously.

4. A boiler as claimed in claim 1 in which the control circuitry includes electronic hysteresis means to prevent the feed valve from being opened and closed in rapid succession.

5. A boiler as claimed in claim 1 in which the voltage-responsive means comprises a two-state electronic device whose output reverses its polarity when a voltage applied to an input reaches a predetermined magnitude, the alternating voltage appearing at the water level sensing electrode when the water is in contact therewith being applied as an input to the two-state electronic device through a rectifier, and a gated rectifier which controls the current supply to the feed valve, the output of the two-state electronic device being applied to the gate of the gated rectifier.

* * * * *

UNITED STATES PATENT OFFICE
CERTIFICATE OF CORRECTION

Patent No. 3,944,785     Dated March 16, 1976

Inventor(s) Raymond H. Eaton-Williams

It is certified that error appears in the above-identified patent and that said Letters Patent are hereby corrected as shown below:

On the title page, under item [30], change "Aug. 3, 1973 ... 36934/73" (first occurrence) to --Feb. 16, 1973 United Kingdom... .........7835/73--;

Column 6, line 65, "water, flow" should read --water flow--. Column 7, line 4, "point 5" should read --point 95--.

Signed and Sealed this

First Day of March 1977

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,944,785   Dated March 16, 1976

Inventor(s) Raymond H. Eaton-Williams

It is certified that error appears in the above-identified patent and that said Letters Patent are hereby corrected as shown below:

Under Item [57], in line 1 of the abstract, "veritcal" should read --- vertical ---.

Signed and Sealed this fifth Day of July 1977

[SEAL]

Attest:

RUTH C. MASON
Attesting Officer

C. MARSHALL DANN
Commissioner of Patents and Trademarks